US008338779B2

(12) United States Patent
Quarmby

(10) Patent No.: US 8,338,779 B2
(45) Date of Patent: Dec. 25, 2012

(54) OPTIMIZATION OF EXCITATION VOLTAGE AMPLITUDE FOR COLLISION INDUCED DISSOCIATION OF IONS IN AN ION TRAP

(75) Inventor: Scott T. Quarmby, Round Rock, TX (US)

(73) Assignee: Thermo Finnigan LLC, San Jose, CA (US)

( * ) Notice: Subject to any disclaimer, the term of this patent is extended or adjusted under 35 U.S.C. 154(b) by 253 days.

(21) Appl. No.: 12/038,696

(22) Filed: Feb. 27, 2008

(65) Prior Publication Data

US 2009/0212209 A1 Aug. 27, 2009

(51) Int. Cl.
*B01D 59/44* (2006.01)

(52) U.S. Cl. .......................... 250/283; 250/282; 250/292

(58) Field of Classification Search ................... 250/283
See application file for complete search history.

(56) References Cited

U.S. PATENT DOCUMENTS 5,352,892 A * 10/1994 Mordehai et al. ............. 250/288
5,696,376 A * 12/1997 Doroshenko et al. ......... 250/292
6,124,591 A 9/2000 Schwartz et al.
6,545,268 B1 * 4/2003 Verentchikov et al. ....... 250/287
6,683,303 B2 1/2004 Yoshinari et al.
6,730,904 B1 * 5/2004 Wells ............................ 250/292
6,967,323 B2 * 11/2005 Hashimoto et al. ........... 250/281
7,232,993 B1 6/2007 Specht et al.

OTHER PUBLICATIONS

Beguin et al., "Protocols for optimizing MS/MS parameters with an ion-trap GC-MS instrument," J. Mass Spectrom., Wiley InterScience, vol. 41, p. 1304-1314, (2006).

Mulholand et al., "Multi-level CID: A Novel Approach for Improving MS/MS on the Quadrupole Ion Trap," Proceedings of the 47th Annual Conference on Mass Spectrometry and Allied Topics, 2 pgs., (1999).

* cited by examiner

*Primary Examiner* — Phillip A Johnston
(74) *Attorney, Agent, or Firm* — Charles B. Katz

(57) ABSTRACT

Collision induced dissociation of precursor ions in an ion trap is performed by determining a predicted fragmentation-optimized excitation voltage amplitude based on an indicator of damping gas pressure, such as a damping gas flow rate, and optionally other parameters including precursor ion m/z and an indicator of the Mathieu parameter q. The excitation voltage may then be applied to electrodes of the ion trap in steps of increasing amplitude, wherein at least one of the amplitudes corresponds to the predicted optimum value. Application of the excitation voltage in this manner produces favorable fragmentation efficiencies over a range of operating parameters and for ions of differing chemical properties.

23 Claims, 6 Drawing Sheets

OPTIMIZATION OF EXCITATION VOLTAGE AMPLITUDE FOR COLLISION INDUCED DISSOCIATION OF IONS IN AN ION TRAP

FIELD OF THE INVENTION

The present invention relates generally to ion trap mass analyzers, and more particularly to techniques for carrying out collision induced dissociation (CID) of ions in an ion trap.

BACKGROUND OF THE INVENTION

Ion trap mass analyzers are widely used for MS/MS or $MS^n$ analysis, in which one or more stages of isolation and fragmentation of precursor ions is performed to generate and analyze product ions. Precursor ions are typically fragmented in an ion trap by the collision induced dissociation (CID) method, whereby the ions are kinetically excited by the application of a excitation voltage to electrodes of the ion trap, such that the excited ions undergo energetic collisions with atoms or molecules of damping gas (also referred to as collision or buffer gas). The CID method is described in U.S. Pat. No. Re 34,000 to Syka et al.

It has long been known that in order to obtain optimal fragmentation efficiency using CID, it is necessary to tune the collision energy for the precursor ion of interest. Schwartz et al. (U.S. Pat. No. 6,124,591) observed a generally linear relationship between the mass-to-charge ratio (m/z) of the precursor ion and its optimal collision energy, and prescribed varying the amplitude of the applied excitation voltage in accordance with this relationship. In an alternative approach, Yoshinari et al. (U.S. Pat. No. 6,683,303) teaches adjusting the duration of application of the excitation voltage based on the m/z of the precursor ion. While these techniques are employed with some success in commercial instruments, the optimal collision energy also depends on molecular properties other than m/z as well as instrument operating parameters, and so predicted values of excitation voltage amplitude or duration based solely on precursor ion m/z may not uniformly yield high abundances of fragment ions for different ion species or across a range of operating conditions.

Mulholland et al. ("Multi-Level CID: A Novel Approach for Improving MS/MS on the Quadrupole Ion Trap", *Proc. 47th Ann. Conf. on Mass Spectrometry,* 1999) describes one approach for avoiding the problems associated with collision energy optimization. This approach involves applying the excitation voltage in a stepped fashion, whereby the excitation voltage amplitude is successively increased from a minimum value to a maximum value in discrete increments. The minimum, maximum, and intermediate excitation voltage amplitudes (a total of five amplitude levels are employed in a representative implementation) may be automatically calculated based on the m/z of the precursor ion, the calibrated resonance ejection voltage for the precursor ion, and the pseudo-potential well model. By using successively increasing collision energies, the possibility of ejecting precursor ions before fragmentation is diminished, and the odds of obtaining favorable ion fragmentation efficiencies are increased.

Specht et al. (U.S. Pat. No. 7,232,993) discloses a CID technique that attempts to optimize fragmentation energies by taking into account both the m/z of the precursor ion and the Mathieu parameter q, which is directly proportional to the amplitude of the trapping voltage and inversely proportional to the precursor ion m/z. In one implementation of this technique, a fragmentation-optimized excitation voltage amplitude is selected based on the values of precursor ion m/z and q; and fragmentation is carried out at the selected amplitude; according to another implementation, fragmentation-optimized values of the excitation voltage amplitude and q are determined based on the precursor ion m/z, and fragmentation is carried out at these values by appropriately adjusting the trapping voltage amplitude in addition to the excitation voltage amplitude.

There remains a need in the art for a CID technique that will yield high fragmentation efficiencies for a variety of ion types and over a range of operating conditions.

SUMMARY

In accordance with an illustrative embodiment of the present invention, a method for fragmenting ions in an ion trap includes determining an excitation voltage amplitude based at least partially on the m/z of the precursor ion and an indicator of the damping gas pressure within the internal volume of the ion trap, and applying the excitation voltage at the determined amplitude. The flow rate of damping gas into the trap may serve as the pressure indicator. In certain implementations, the determination of excitation voltage amplitude may also be based partially on the q of the precursor ions. It has been observed that the fragmentation-optimized excitation voltage amplitude is strongly dependant on damping gas pressure, and so the excitation voltage amplitude that optimizes fragmentation for a precursor ion of interest may be predicted with significantly greater reliability if the damping gas pressure (or an indicator thereof) is included as a parameter in the prediction function.

Fragmentation efficiencies may be further improved by utilization of the multi-level CID technique disclosed in the aforementioned Mulholland et al. reference. In one specific example, fragmentation of a precursor ion is performed by calculating a predicted optimized excitation voltage amplitude based on precursor ion m/z and the pressure indicator (and, optionally, the q of the precursor ion), and then applying the excitation voltage at three successively increasing amplitudes: the first, second and third amplitudes being respectively less than (e.g., by 50%), equal to, and greater than (e.g., by 80%) the predicted optimized amplitude. These amplitude levels are set to cover the range of fragmentation optimized excitation voltage amplitudes observed for compounds of varying ion chemistry.

DETAILED DESCRIPTION OF ILLUSTRATIVE EMBODIMENTS

Figure 1:
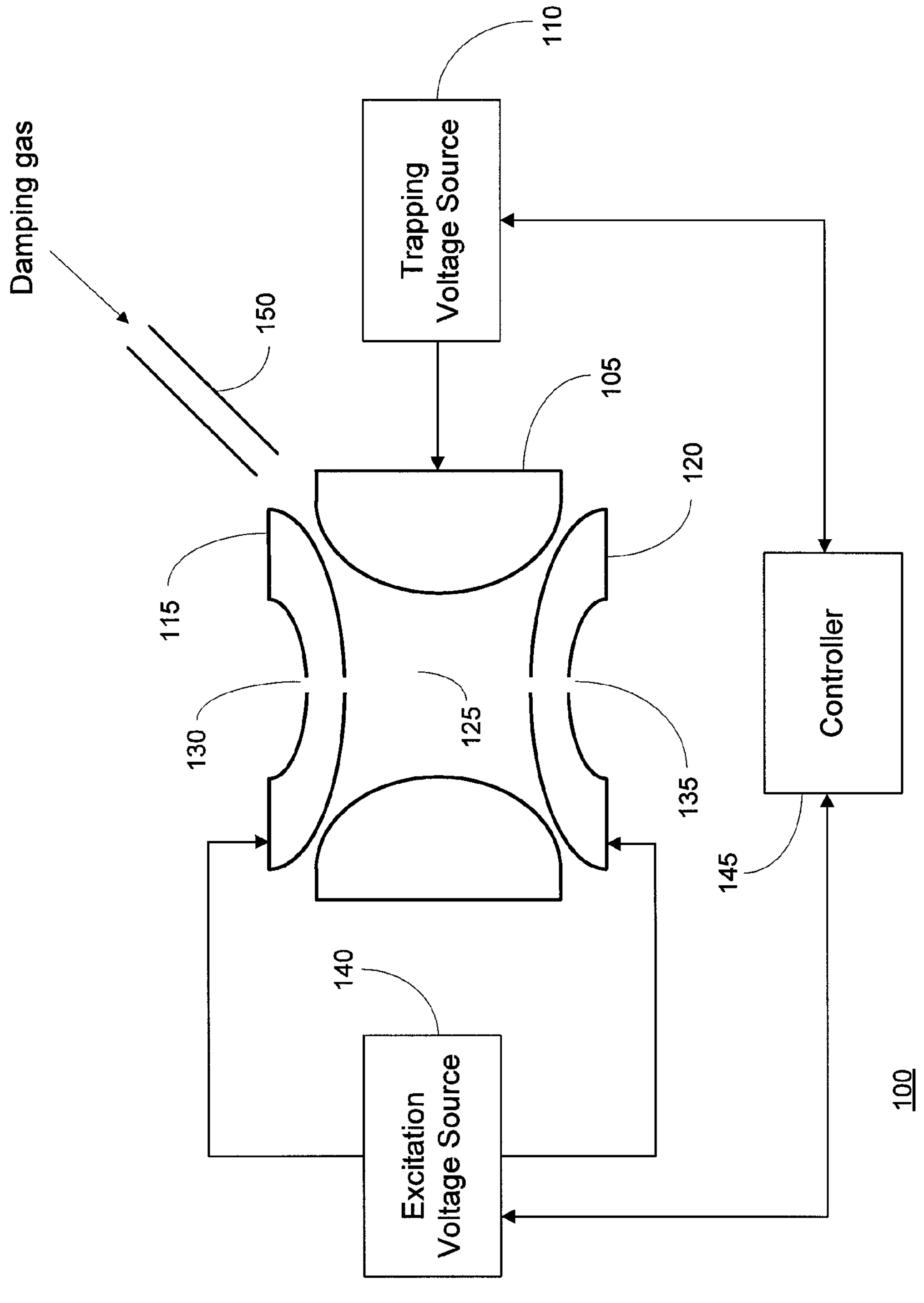
FIG. 1 is a schematic illustration of a three-dimensional ion trap mass analyzer in which the CID technique of the present invention may be advantageously implemented.

FIG. 1 depicts a conventional three-dimensional ion trap mass analyzer 100 which may be used to carry out collision induced dissociation (CID) of precursor ions, in accordance with embodiment of the present invention. Ion trap 100 includes a ring electrode 105 to which a radio-frequency (RF) trapping voltage is applied by RF trapping voltage source 110. End cap electrodes 115 and 120 are positioned adjacent to ring electrode 105 to define an interior volume 125 into which ions are admitted and trapped. Inlet and outlet apertures 130 and 135 formed respectively in end cap electrodes 115 and 120 provide passageways for the admission of ions to and ejection of ions from interior volume 125.

An excitation voltage source 140 applies an excitation voltage of controllable amplitude to end cap electrodes 115 and 120. The dipolar excitation field resulting from application of the excitation voltage kinetically excites at least a portion of the ions held within interior volume 125, such that the amplitudes of ion trajectories increase with time. For isolation and mass-sequential scanning functions, the amplitudes of the excited ions' trajectories are increased to the point that they exceed the dimensions of interior volume 125, and the excited ions are thus ejected from trap 100 or are destroyed when they come into contact with surfaces of the ring or end cap electrodes. However, when ions are kinetically excited for the purpose of conducting fragmentation of precursor ions for MS/MS or $MS^n$ analysis, it is generally desirable to apply an excitation voltage of relatively low amplitude so as to avoid excessive losses of the precursor ion by ejection or contact with electrode surfaces.

The excitation voltage applied for fragmentation will typically be an oscillatory voltage having a single frequency or composed of two or more frequencies. To effect kinetic excitation and consequent fragmentation of a selected precursor ion species, the excitation voltage will have at least one frequency component that matches (i.e., is resonant or near-resonant to) a secular frequency of the precursor ions' oscillatory movement within ion trap 100. In an alternative implementation, the excitation voltage may be implemented as a DC or quasi-DC pulse constituting a broad range of component frequencies, at least one of which matches a secular frequency of the precursor ions.

Excitation voltage source 140 and RF trapping voltage source 110 communicate with and operate under the control of controller 145, which may take the form of any suitable combination of hardware devices (e.g., application specific circuitry, field-programmable gate arrays, and specialized or general purpose microprocessors) and software or firmware instructions. Controller 145 will also include memory for storing coefficients and other data determined or collected during the calibration process, as is discussed below in connection with FIG. 2. Controller 145 is operable to adjust the amplitude and frequency of the excitation voltage applied to end cap electrodes 115 and 120, as well as the amplitude of the RF trapping voltage applied to ring electrode 105.

Damping gas, typically an inert gas such as helium, argon or nitrogen, is added to interior volume 125 of ion trap 100 via a damping gas source in the form of a conduit 150 coupled to a gas cylinder or other supply. A mass flow controller or similar device (not depicted) regulates the flow rate of damping gas into the ion trap. The damping gas flow rate may be set by the user through a user interface or by manipulation of the appropriate controls. It should be recognized that gases added elsewhere in the mass spectrometer instrument, such as methane or ammonia gas supplied to a chemical ionization source, may enter interior volume 125 and act as the damping gas.

It will be appreciated that the three-dimensional ion trap depicted and described herein is presented as an illustrative example, and the CID techniques described below should not be construed as being limited to use with ion traps having any particular geometry or configuration. Other types of ion traps known in the art with which the techniques of the present invention may be beneficially utilized include two-dimensional ion traps (also referred to as linear ion traps and described, for example, in U.S. Pat. No. 5,420,425 to Bier et al., the disclosure of which is incorporated by reference), rectilinear ion traps, and cylindrical ion traps.

Figure 2:
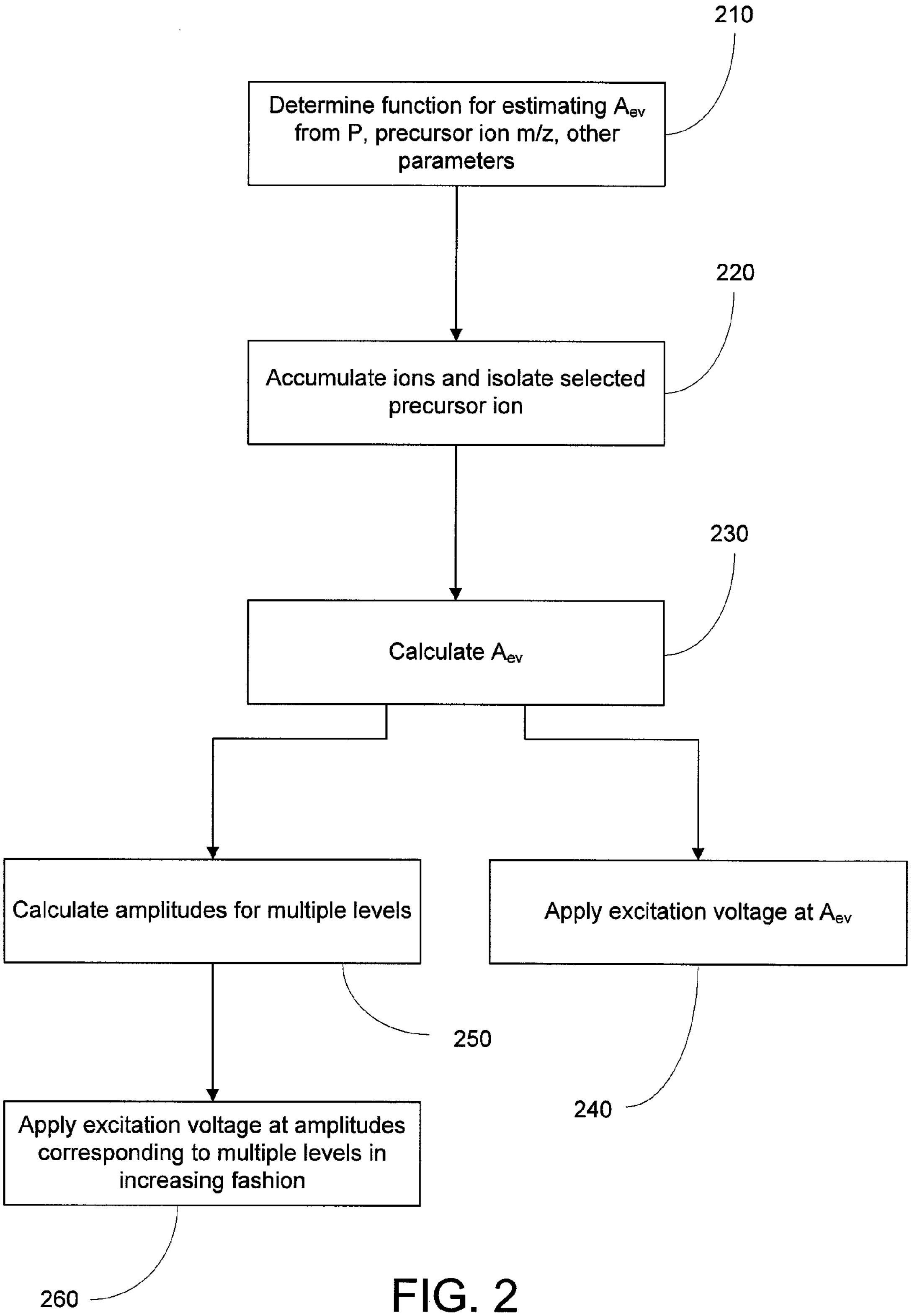
FIG. 2 is a flowchart depicting the steps of a method for carrying out fragmentation of precursor ions in an ion trap, according to a first embodiment of the present invention.

A method for performing CID in an ion trap mass analyzer (such as three-dimensional ion trap 100) in accordance with an embodiment of the invention is depicted in flowchart form in FIG. 2. In the initial step 210, a mathematical relationship for estimating an optimum excitation voltage amplitude (denoted herein as $A_{ev}$) is established by varying the operating parameters over prescribed ranges and determining, for a particular set of operating parameter values, the empirically-determined excitation voltage amplitude that optimizes the fragmentation efficiency (measured by the total product (fragment) ion intensity in the mass spectrum acquired after fragmentation). According to the present example, the operating parameters varied during the calibration process include a damping gas pressure indicator, precursor ion m/z, and optionally an indicator of the Mathieu parameter q for the precursor ion. For ion trap 100 depicted in FIG. 1, the damping gas pressure within interior volume 125 is directly proportional to the damping gas flow rate through source 150, and so the damping gas flow rate may be used as the damping gas pressure indicator. Other operating parameters that may serve as damping gas pressure indicators include CI gas flow rate and pumping speed. It is also possible that the damping gas pressure may be measured directly and the measured value used as the damping gas pressure indicator. The indicator of q may be a calculated value based on the known relationship of q to trapping voltage amplitude and frequency, trap dimensions, and precursor ion m/z, or may instead be the trapping voltage amplitude (which is varied to adjust q) or other operating parameter that determines q and may be varied during operation of the mass spectrometer. The calibration step 210 may be conducted in a fully automated (i.e., without the need for user intervention), semi-automated (e.g., where the user supplies the range of operating parameters to be used for calibration) or manual mode.

Figure 3:
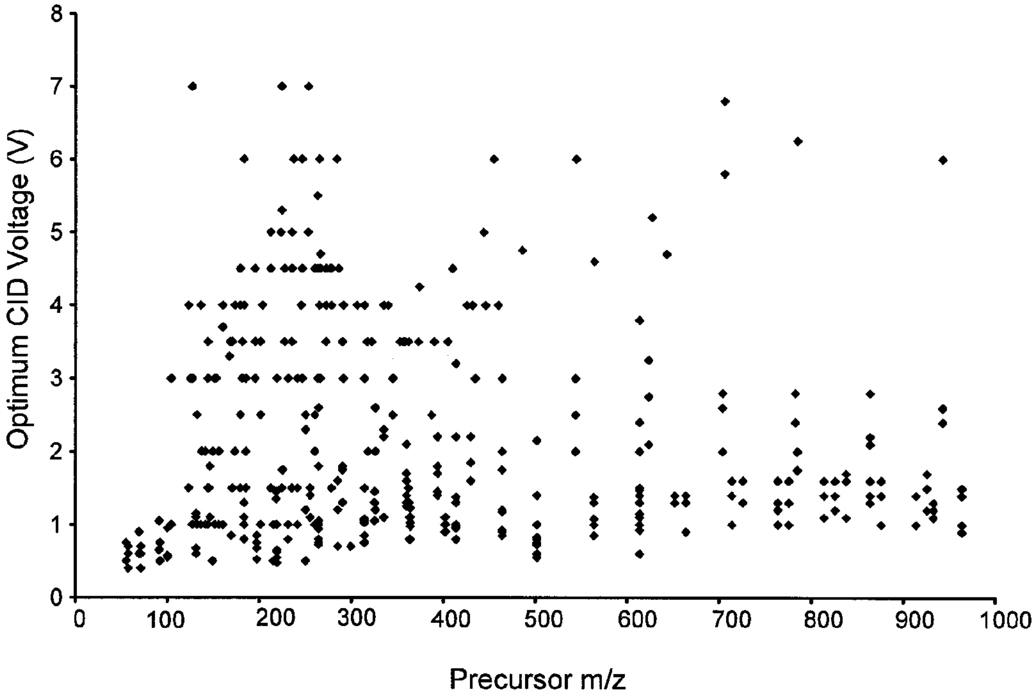
FIG. 3 is a graph showing the variation of empirically-determined optimum excitation voltage amplitude with m/z for several precursor ions under various conditions of the Mathieu parameter q and damping gas pressure.

FIG. 3 is a graph showing an example of empirically-determined optimum excitation voltage amplitudes for different precursor ions under various conditions of damping gas pressure and q. The graph shows the empirically-determined amplitude as a function of precursor ion m/z, which is the operating parameter conventionally utilized to predict the optimum amplitude. In view of the clearly discernible variance from a linear relationship between optimum amplitude and precursor ion m/z, it is apparent that precursor ion m/z alone does not serve as a reliable predictor of optimum amplitude, and thus a predicted optimum amplitude based solely on precursor m/z may frequently underestimate or overestimate the amplitude value that yields optimal fragmentation efficiency.

Figure 4:
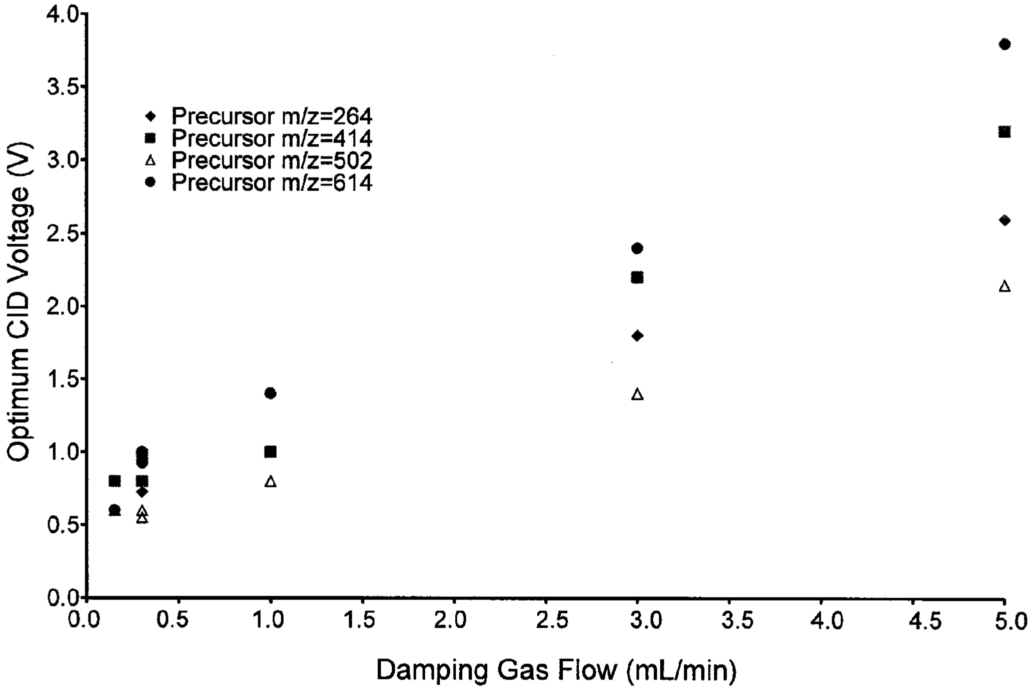
FIG. 4 is a graph showing the variation of optimum excitation voltage with an indicator of damping gas pressure for several precursor ions.
Figure 5:
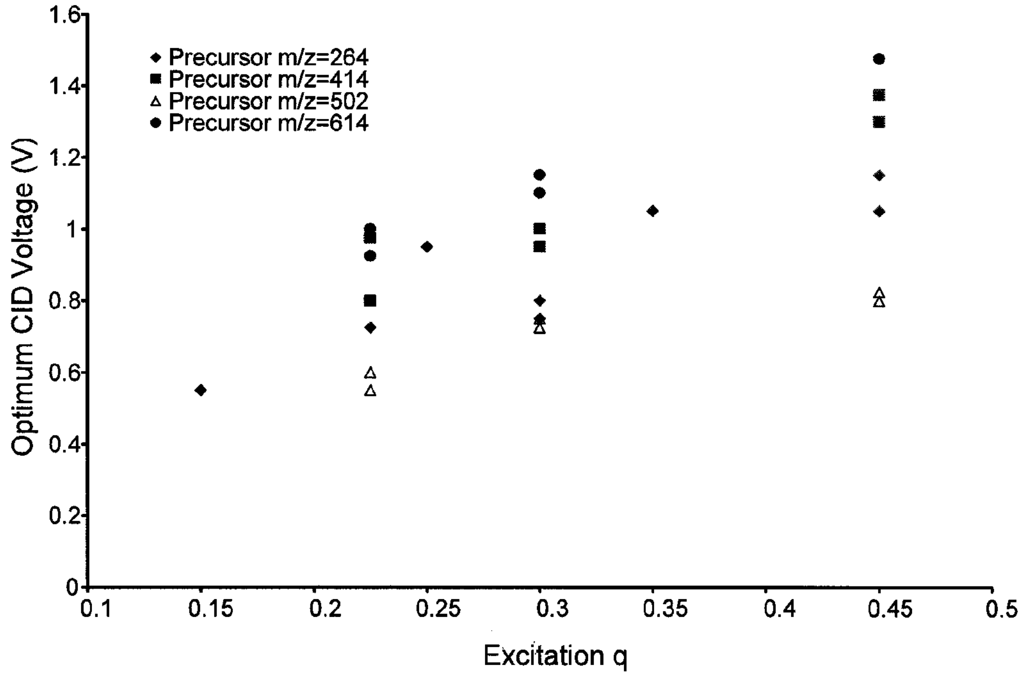
FIG. 5 is a graph showing the variation of optimum excitation voltage with the Mathieu parameter q for several precursor ions.

FIG. 4 is a graph showing an example of the empirically-determined optimum excitation voltage amplitude for several precursor ions of differing m/z's as a function of the damping gas pressure indicator (in this case, damping gas flow rate). It is observed that the damping gas pressure indicator strongly influences the optimum amplitude, and that, for a given precursor ion, the variation of optimum amplitude with damping gas flow rate is approximately linear. Similarly, FIG. 5 shows that for a given precursor ion, an approximately linear relationship exists between q and the empirically-determined optimum excitation voltage amplitude. It should be recognized that over the normal range of operating parameters, the damping gas flow rate will typically have the largest influence on optimum excitation voltage amplitude.

Data gathered during the calibration process are fit to an optimum amplitude prediction function using known statistical methods to minimize variance (e.g., by least-squares regression). In one example, the prediction function takes the linear form:

$$A_{ev}=a*P+b*(m/z)+c*q+d$$

where $A_{ev}$ is the predicted fragmentation-optimized excitation voltage amplitude, P is the damping gas pressure indicator, m/z is the precursor ion m/z, q is the indicator of the Mathieu parameter for the precursor ion, and a, b, c, and d are the best-fit coefficients. Other implementations may utilize a non-linear prediction function (e.g., polynomial or cubic spline) to fit the calibration data.

The coefficients derived from the curve fitting step may be stored in memory of controller 145. If desirable, a look up table may be constructed using the prediction function and stored in memory so that predicted values of $A_{ev}$ may be easily and quickly retrieved using input values of P, m/z, and q. The calibration step 210 may be repeated at specified intervals so that the prediction curve coefficients are adjusted to accommodate changes in instrument performance.

Figure 6:
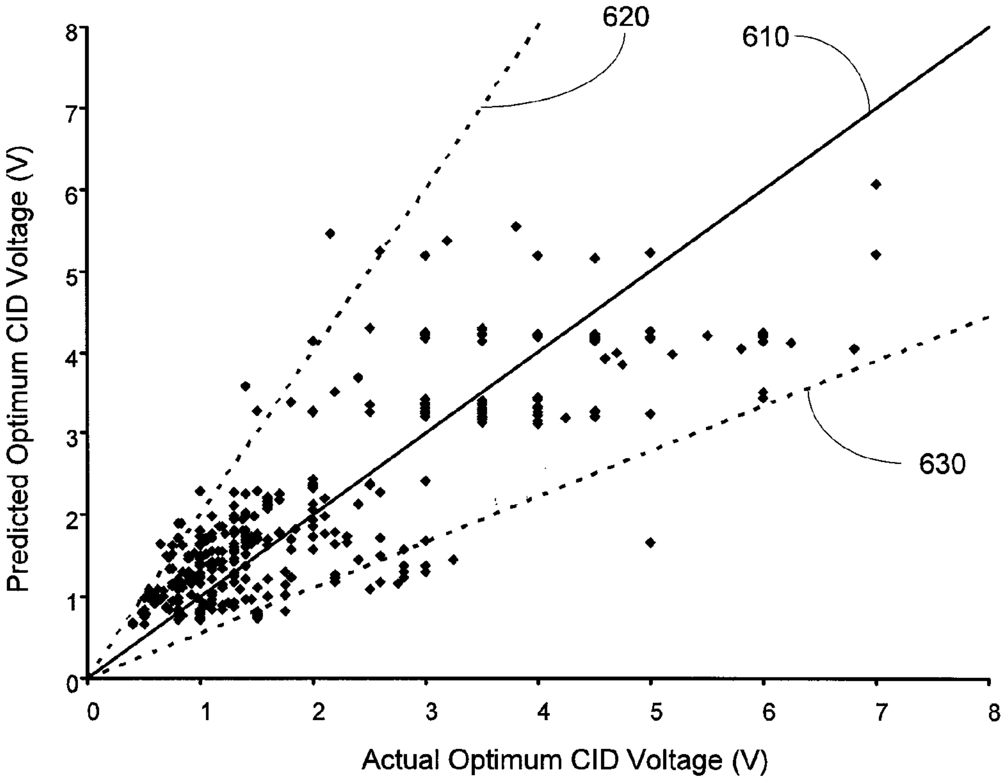
FIG. 6 is a graph depicting the relation of predicted fragmentation-optimized excitation voltage amplitude to the actual (empirically determined) optimum amplitude, for several precursor ions over a range of operating conditions.

FIG. 6 is a graph depicting, for data collected during the calibration step over a range of operating parameters, the relation between the predicted fragmentation-optimized excitation voltage amplitude (using the linear prediction function described above) and the actual (empirically-determined) optimum amplitude. It is seen that there is still a significant amount of variance from the predicted values due to differences in ion chemistry. As will be discussed in further detail hereinbelow, one approach for accommodating this inherent variance involves using a multi-level CID technique whereby the excitation voltage is applied in a stepped fashion at progressively increasing amplitudes, the amplitude levels being derived from the predicted optimum.

In step 220, the ion trap is filled, and a selected precursor ion species is isolated within the interior volume of the ion trap. Techniques for injecting ions into the trap and isolating precursor ions are well-established in the mass spectrometry art and need not be described herein. According to an exemplary implementation, precursor ion isolation is accomplished by applying a notched multi-frequency excitation voltage to end cap electrodes 115 and 120, such that all ions having m/z's outside a range corresponding to the frequency notch are kinetically excited to the point where they are ejected from the trap or are neutralized by contact with electrode surfaces.

In step 230, the predicted fragmentation-optimized excitation voltage amplitude $A_{ev}$ is determined from the existing operating parameters (e.g., precursor ion m/z, damping gas flow rate, and q) using, for example, the linear prediction function set forth above. $A_{ev}$ may be calculated, or retrieved from a look up table generated during the calibration step 110, as discussed above.

Once $A_{ev}$ has been determined, fragmentation of the precursor ions may be performed by applying an excitation voltage at amplitude $A_{ev}$ to electrodes of the ion trap (e.g., end cap electrodes 115 and 120) for a prescribed excitation period, as represented by step 240 in the FIG. 2 flowchart. However, as discussed above in connection with FIG. 6, the prediction function may tend to significantly overestimate or underestimate the optimum amplitude for certain ions due to the inherent variability of ion chemistry, such that application of the excitation voltage at $A_{ev}$ may not produce optimal fragmentation efficiencies due to either insufficient collision energies or premature ejection of the precursor ion.

In order to compensate for this variance from the predicted fragmentation-optimized amplitude, it is beneficial to employ a multi-level CID technique, in which the excitation voltage is applied during the excitation period at progressively higher amplitudes. This multi-level technique is represented by steps 250 and 260 of FIG. 2. In step 250, a plurality of excitation voltage amplitudes are determined, at least one of which is derived from the predicted fragmentation-optimized excitation amplitude $A_{ev}$. In a representative example, three amplitudes are calculated: the first amplitude being less than $A_{ev}$, the second amplitude being equal to $A_{ev}$, and the third amplitude being greater than $A_{ev}$. The amplitude levels are selected to cover the range of the actual fragmentation-optimized excitation amplitudes observed for compounds of varying ion chemistry. Referring to FIG. 6, it is seen that for a large majority of the compounds represented therein (>90%), the actual optimum amplitudes fall within a range extending between 50% of the predicted fragmentation-optimized value (depicted as lower dotted line 630) and 180% of the predicted fragmentation-optimized value (depicted as upper dotted line 620). In accordance with this observation, when the first, second and third amplitudes are set to $0.5*A_{ev}$, $A_{ev}$, and $1.8*A_{ev}$, respectively, high fragmentation efficiencies will be achieved for at least 90% of the ion species.

Figure 7:
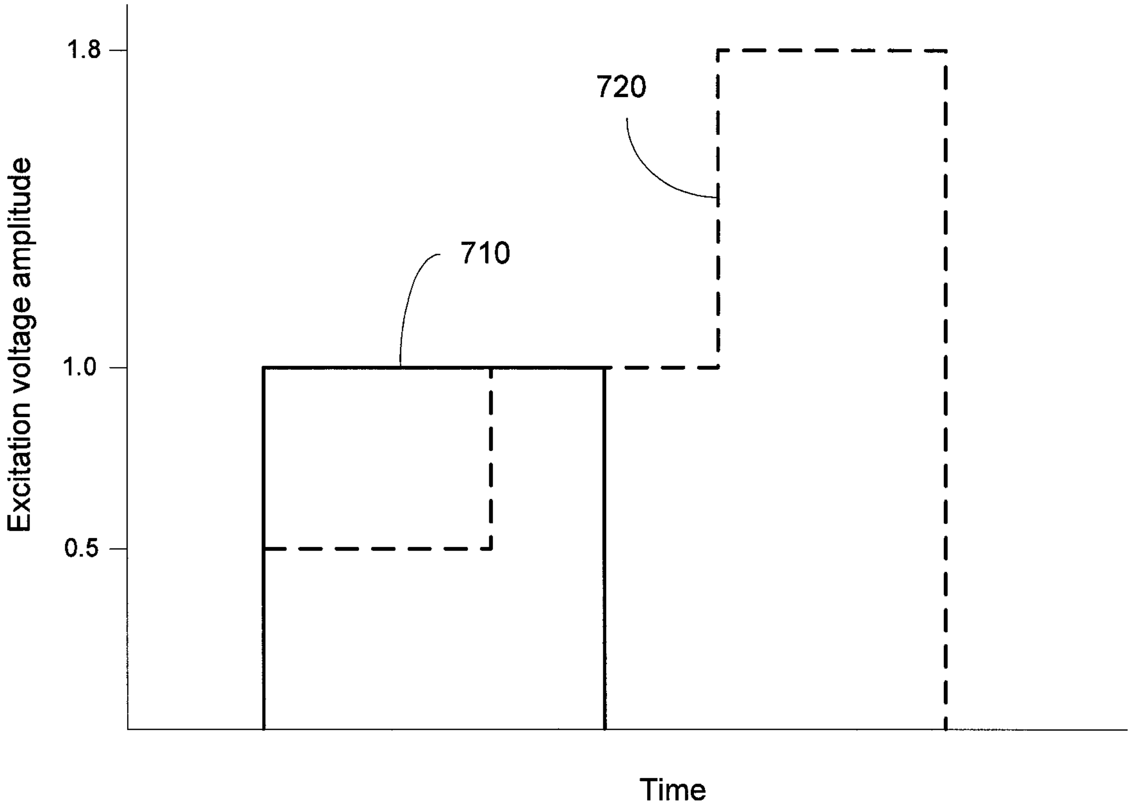
FIG. 7 is a graph depicting the application of the excitation voltage in accordance with single amplitude and stepped amplitude implementations.

In step 260, the precursor ions are fragmented by applying the excitation voltage to electrodes of the ion trap at successively increasing levels corresponding to the determined amplitudes. The stepped application of the excitation voltage is represented as dotted line 720 in FIG. 7, which depicts the variation of the excitation voltage amplitude with time during the excitation period. It will be appreciated that a longer excitation period will typically be required for the multi-level technique relative to the single amplitude technique (represented by solid line 710). For example, an excitation period of 15 milliseconds may be adequate when the single-level technique is employed, whereas a multi-level application of the excitation using three amplitude steps may take 30 milliseconds, as it has been observed that a minimum of 10 milliseconds is required at each excitation amplitude to produce efficient fragmentation. It will be recognized that utilization of a greater number of amplitude levels may provide for optimized fragmentation efficiencies for a higher percentage of the ion species to be analyzed; however, doing so may require fragmentation periods of unacceptably long duration.

Figure 8:
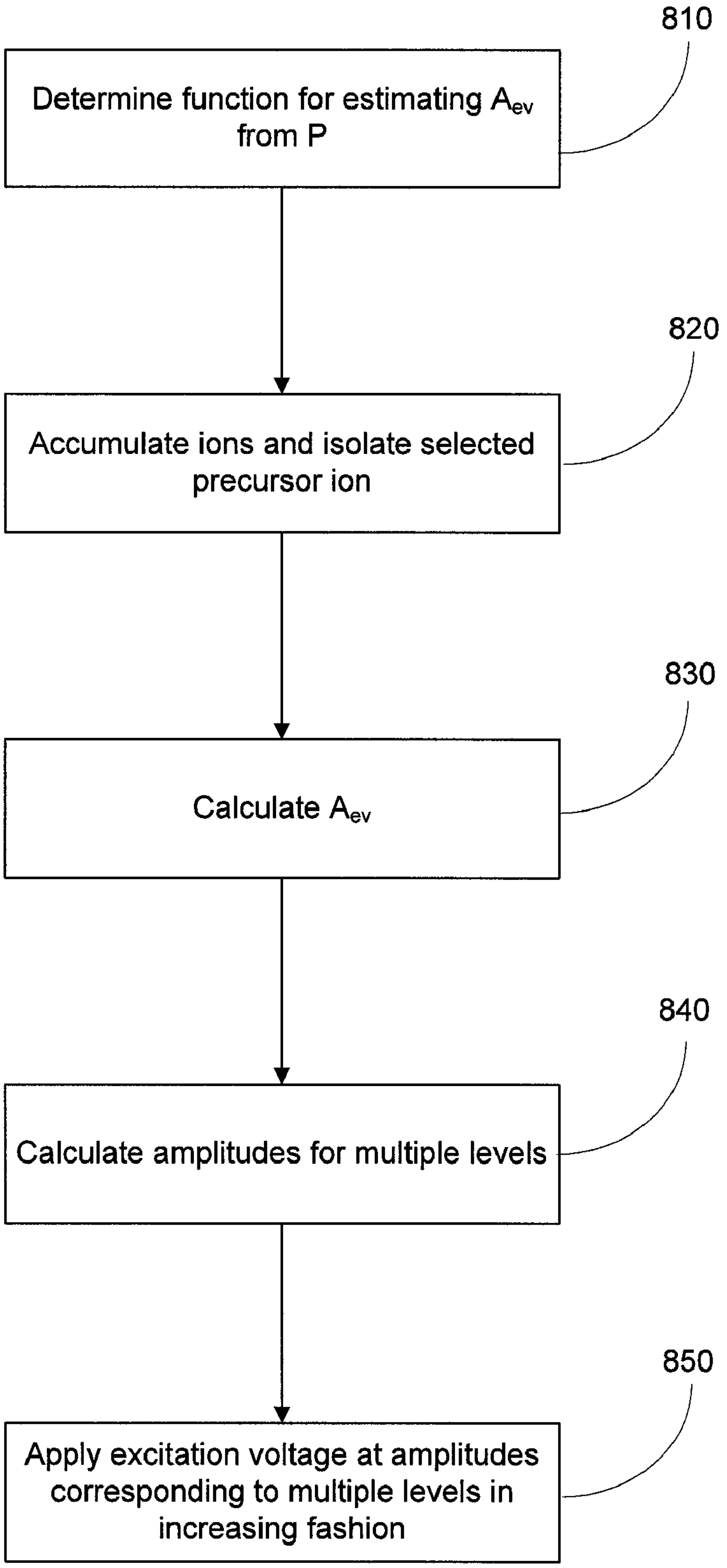
FIG. 8 is a flowchart depicting the steps of a method for carrying out fragmentation of precursor ions in an ion trap, according to a second embodiment of the present invention.

FIG. 8 is a flowchart of a variant on the FIG. 2 method, including similar steps of calibration 810, filling and precursor isolation 820, predicted fragmentation-optimized excitation amplitude calculation 830, and multi-level application of the excitation voltage 840 and 850. In contradistinction to the FIG. 2 method, however, the FIG. 8 method does not use precursor ion m/z as a parameter for determining the predicted optimum magnitude; instead, the determination is based only on the damping gas pressure indicator parameter (e.g., damping gas flow rate) and, optionally, other operating parameters such as RF trapping voltage. Because such a method results in a considerable amount of variance of the actual fragmentation-optimized excitation voltage amplitude relative to the predicted value (since precursor ion m/z, which does influence the optimum voltage, is not directly taken into account), the multi-level excitation voltage is employed to ensure that acceptable fragmentation efficiencies are achieved for a variety of precursor ions.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of fragmenting precursor ions in an ion trap operable at variable pressure, comprising:

setting a damping gas pressure within the ion trap in accordance with user input;

determining an existing value of an indicator of the damping gas pressure; and applying an excitation voltage to the ion trap to cause the precursor ions to undergo energetic collisions with the damping gas and produce product ions, the amplitude of the excitation voltage being based at least in part on the mass-to-charge ratio (m/z) of the precursor ions and the existing value of the indicator of the damping gas pressure in the ion trap.

2. The method of claim 1, wherein the excitation voltage amplitude is also based on an indicator of the Mathieu parameter q of the precursor ions.

3. The method of claim 2, wherein the q indicator is an amplitude of a trapping voltage applied to the ion trap.

4. The method of claim 1, wherein the damping gas pressure indicator is a damping gas flow rate.

5. The method of claim 1, wherein the step of applying an excitation voltage includes determining the excitation voltage amplitude according to the function:

$$Aev=a*m/z+b*P+c*q+d$$

where Aev is the excitation voltage amplitude, P is the damping gas pressure indicator, q is an indicator of the Mathieu parameter q for the precursor ions, and a, b, c and d are empirically-determined coefficients.

6. The method of claim 1, wherein the step of applying an excitation voltage includes applying an excitation voltage at a plurality of successively increasing excitation voltage amplitudes, at least one of the plurality of excitation voltage amplitudes being based on the precursor ion m/z and an indicator of the damping gas pressure.

7. The method of claim 6, wherein the plurality of excitation voltage amplitudes includes first, second and third amplitudes, the second amplitude corresponding to a predicted fragmentation-optimized value.

8. The method of claim 7, wherein the first and third amplitudes are specified multiples of the second amplitude.

9. The method of claim 8, wherein the first amplitude is approximately 0.5 times the second amplitude, and the third amplitude is approximately 1.8 times the second amplitude.

10. The method of claim 1, wherein the excitation voltage is an oscillatory excitation voltage.

11. The method of claim 1, wherein the excitation voltage is a direct current (DC) voltage.

12. An ion trap mass analyzer operable at variable damping gas pressure, comprising:

a plurality of electrodes defining an interior volume in which precursor ions are trapped;

a damping gas source for introducing damping gas at a flow rate into the interior volume of the ion trap, the damping gas flow rate being set in accordance with user input;

a trapping voltage source for applying an RF voltage to the ion trap to confine the precursor ions within the interior volume; and an excitation voltage source for applying an excitation voltage to the ion trap to kinetically excite the precursor ions such that they undergo energetic collisions with the damping gas to produce product ions, the amplitude of the excitation voltage being based at least in part on the mass-to-charge ratio (m/z) of the precursor ions and an existing value of an indicator of a damping gas pressure in the interior volume of the ion trap.

13. The ion trap mass analyzer of claim 12, wherein the ion trap mass analyzer is a three-dimensional ion trap.

14. The ion trap mass analyzer of claim 12, wherein the ion trap mass analyzer is a two-dimensional ion trap.

15. The ion trap mass analyzer of claim 12, wherein the excitation voltage amplitude is also based on an indicator of the Mathieu parameter q of the precursor ions.

16. The ion trap mass analyzer of claim 12, wherein the damping gas pressure indicator is a damping gas flow rate.

17. The ion trap mass analyzer of claim 12, wherein the excitation voltage source is configured to apply an excitation voltage at a plurality of successively increasing excitation voltage amplitudes, at least one of the plurality of excitation voltage amplitudes being based on the precursor ion m/z and an indicator of the damping gas pressure.

18. The ion trap mass analyzer of claim 17, wherein the plurality of excitation voltage amplitudes includes first, second and third amplitudes, the second amplitude corresponding to a predicted fragmentation-optimized value.

19. The ion trap mass analyzer of claim 12, wherein the excitation voltage is an oscillatory excitation voltage.

20. The ion trap mass analyzer of claim 12, wherein the excitation voltage is a direct current (DC) voltage.

21. A method of fragmenting precursor ions in an ion trap operable at variable pressure, comprising:

setting a damping gas pressure within the ion trap in accordance with user input;

determining an existing value of an indicator of the damping gas pressure; and applying an excitation voltage to the ion trap at a plurality of successively increasing amplitudes trap to cause the precursor ions to undergo energetic collisions with the damping gas and produce product ions, at least one of the amplitudes of the plurality of amplitudes being based at least in part on the existing value of the indicator of the damping gas pressure in the ion trap.

22. The method of claim 21, wherein the plurality of excitation voltage amplitudes includes first, second and third amplitudes, the second amplitude corresponding to a predicted fragmentation-optimized value.

23. The method of claim 22, wherein the first and third amplitudes are specified multiples of the second amplitude.

* * * * *